(12) United States Patent
Chen et al.

(10) Patent No.: US 12,337,867 B2
(45) Date of Patent: Jun. 24, 2025

(54) SYSTEMS AND METHODS FOR COMMUNICATION-AWARE FEDERATED LEARNING

(71) Applicant: Toyota Motor Engineering & Manufacturing North America, Inc., Plano, TX (US)

(72) Inventors: Yitao Chen, Mountain View, CA (US); Dawei Chen, Mountain View, CA (US); Haoxin Wang, Mountain View, CA (US); Kyungtae Han, Mountain View, CA (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 239 days.

(21) Appl. No.: 17/994,850

(22) Filed: Nov. 28, 2022

(65) Prior Publication Data
US 2024/0174254 A1 May 30, 2024

(51) Int. Cl.
*B60W 60/00* (2020.01)
*G06F 18/214* (2023.01)

(52) U.S. Cl.
CPC ......... *B60W 60/001* (2020.02); *G06F 18/214* (2023.01); *B60W 2420/403* (2013.01)

(58) Field of Classification Search
CPC ........ G06F 18/2014; B60W 2420/403; B60W 60/001

(Continued)

(56) References Cited

U.S. PATENT DOCUMENTS 12,093,972 B1 * 9/2024 Li ........................ H03M 7/3059
2020/0229206 A1 * 7/2020 Badic ................ H04W 52/0209
(Continued)

FOREIGN PATENT DOCUMENTS

| CN | 113742778 A | 12/2021 |
|---|---|---|
| CN | 113258935 B | 3/2022 |

(Continued)

OTHER PUBLICATIONS

Yujie Tang, et al., "Communication-Efficient Distributed SGD With Compressed Sensing", Journal of Mathematics, Optimization and Control, Dec. 15, 2021.
(Continued)

*Primary Examiner* — Yazan A Soofi
(74) *Attorney, Agent, or Firm* — Dinsmore & Shohl LLP

(57) ABSTRACT

A system for communication-aware federated learning includes a server and edge nodes. Each of the edge nodes trains a machine learning model using first local data obtained by sensors of corresponding edge node. Each of the edge nodes obtains network bandwidth for a channel between corresponding edge node and the server. One or more of the edge nodes determines a level of compression based on the bandwidth for the channel, compresses the trained machine leaning model based on the determined level of compression, and transmits the compressed trained machine learning model to the server. The server decompresses the compressed trained machine learning models and aggregates the decompressed trained machine learning models to obtain the aggregated machine learning model, and transmits the aggregated machine learning model to each of the edge nodes. Each of the edge nodes receives the aggregated machine learning model from the server.

20 Claims, 5 Drawing Sheets

(58) Field of Classification Search
USPC .......................................................... 701/23
See application file for complete search history.

(56) References Cited

U.S. PATENT DOCUMENTS

| | | | |
|---|---|---|---|
| 2021/0116907 A1* | 4/2021 | Altman | B60W 60/0015 |
| 2022/0051476 A1* | 2/2022 | Woop | G06T 1/20 |
| 2022/0156633 A1* | 5/2022 | Anwar | H04L 67/10 |
| 2023/0215091 A1* | 7/2023 | Drabinski | G06T 15/005 |
| | | | 345/426 |

FOREIGN PATENT DOCUMENTS

| | | |
|---|---|---|
| CN | 110909865 B | 8/2022 |
| CN | 114841370 A | 8/2022 |
| WO | 2021050039 A1 | 3/2021 |

OTHER PUBLICATIONS

Yujun Lin, et al., "Deep Gradient Compression: Reducing the Communication Bandwidth for Distributed Training", Conference paper at the Sixth International Conference on Learning Representations 2018, v3 Jun. 23, 2020.

Mohammad Mohammadi Amiri, et al., "Convergence of Update Aware Device Scheduling for Federated Learning at the Wireless Edge", Journal of Computer Science Information Theory, v2 May 8, 2020.

Muhammad Habib Ur Rehman, et al., "Towards Blockchain-Based Reputation-Aware Federated Learning", Conference Paper at IEEE INFOCOM 2020—IEEE Conference on Computer Communications Workshops, Feb. 2020, pp. 183-188.

* cited by examiner

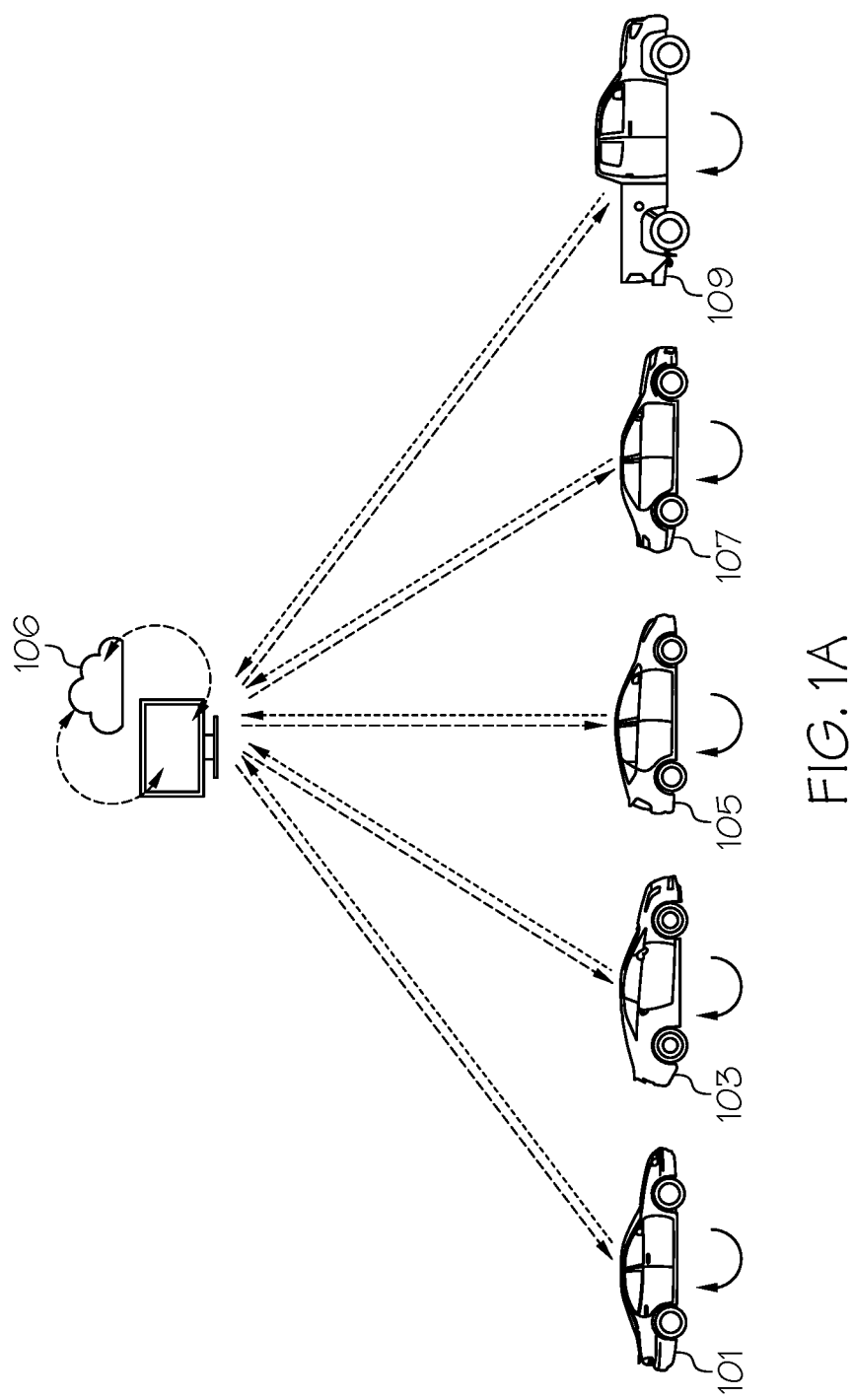

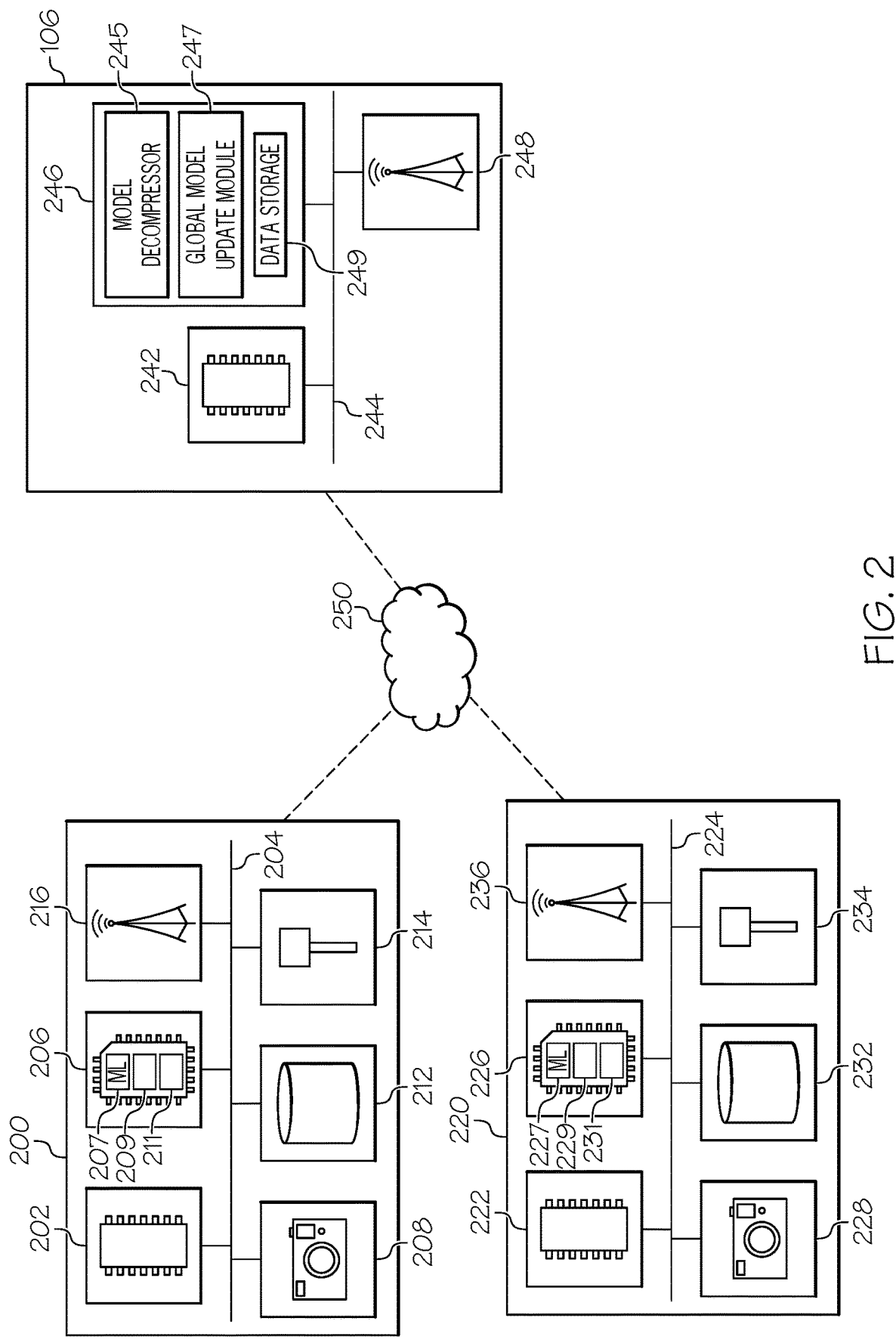

SYSTEMS AND METHODS FOR COMMUNICATION-AWARE FEDERATED LEARNING

TECHNICAL FIELD

The present disclosure relates to systems and methods for communication-aware federated learning, more specifically, to systems and methods for adaptively adjusting a level of compression in federated learning based on bandwidth information between edge nodes and an edge server.

BACKGROUND

In vehicular technologies, such as object detection for vehicle cameras, the distributed learning framework is still under exploration. With the rapidly growing amount of raw data collected at individual vehicles, in the aspect of user privacy, the requirement of wiping out personalized, confidential information and the concern for private data leakage motivate a machine learning model that does not require raw data transmission. In the meantime, raw data transmission to the data center becomes heavier or even infeasible or unnecessary to transmit all raw data. Without sufficient raw data transmitted to the data center due to communication bandwidth constraints or limited storage space, a centralized model cannot be designed in the conventional machine learning paradigm. Federated learning, a distributed machine learning framework, is employed when there are communication constraints and privacy issues. The model training is conducted in a distributed manner under a network of many edge nodes (e.g., vehicles, mobile devices, etc.) and an edge server. However, the conditions of wireless communication between edge nodes and the edge server may vary during federated learning. It takes relatively longer time for certain edge nodes to exchange machine learning models with the edge server.

Accordingly, a need exists for a vehicular network that takes into account different conditions of wireless communication between edge nodes and an edge server such that local machine learning models from edge nodes can be uploaded to the edge server within a designated time window.

SUMMARY

The present disclosure provides systems and methods for adaptively adjusting a level of compression in federated learning based on network bandwidth information between edge nodes and an edge server.

In one embodiment, a vehicle includes a controller programmed to: train a machine learning model using first local data, obtain a network bandwidth for a channel between the vehicle and a server, determine a level of compression based on the network bandwidth for the channel, compress the trained machine leaning model based on the determined level of compression, transmit the compressed trained machine learning model to the server, receive an aggregated machine learning model from the server, and control the vehicle to drive autonomously based on the aggregated machine learning model.

In another embodiment, a method for communication-aware federated learning is provided. The method includes training a machine learning model using first local data, obtaining a network bandwidth for a channel between a vehicle and a server, determining a level of compression based on the network bandwidth for the channel, compressing the trained machine leaning model based on the determined level of compression; transmitting the compressed trained machine learning model to the server, receiving an aggregated machine learning model from the server, and controlling the vehicle to drive autonomously based on the aggregated machine learning model.

In another embodiment, a system for communication-aware federated learning is provided. The system includes a server and a plurality of vehicles. Each of the plurality of vehicles includes a controller programmed to: train a machine learning model using first local data, obtain a network bandwidth for a channel between the vehicle and the server, determine a level of compression based on the bandwidth for the channel, compress the trained machine leaning model based on the determined level of compression, transmit the compressed trained machine learning model to the server, receive an aggregated machine learning model from the server, and control the vehicle to drive autonomously based on the aggregated machine learning model. The server generates the aggregated machine learning model based on the compressed trained machine learning models from the plurality of vehicles.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 1A schematically depicts a system for updating local machine learning models using federated learning, in accordance with one or more embodiments shown and described herewith;

FIG. 2 depicts a schematic diagram of a system for updating local machine learning models for image processing using federated learning, according to one or more embodiments shown and described herein;

DETAILED DESCRIPTION

Figure 1B:
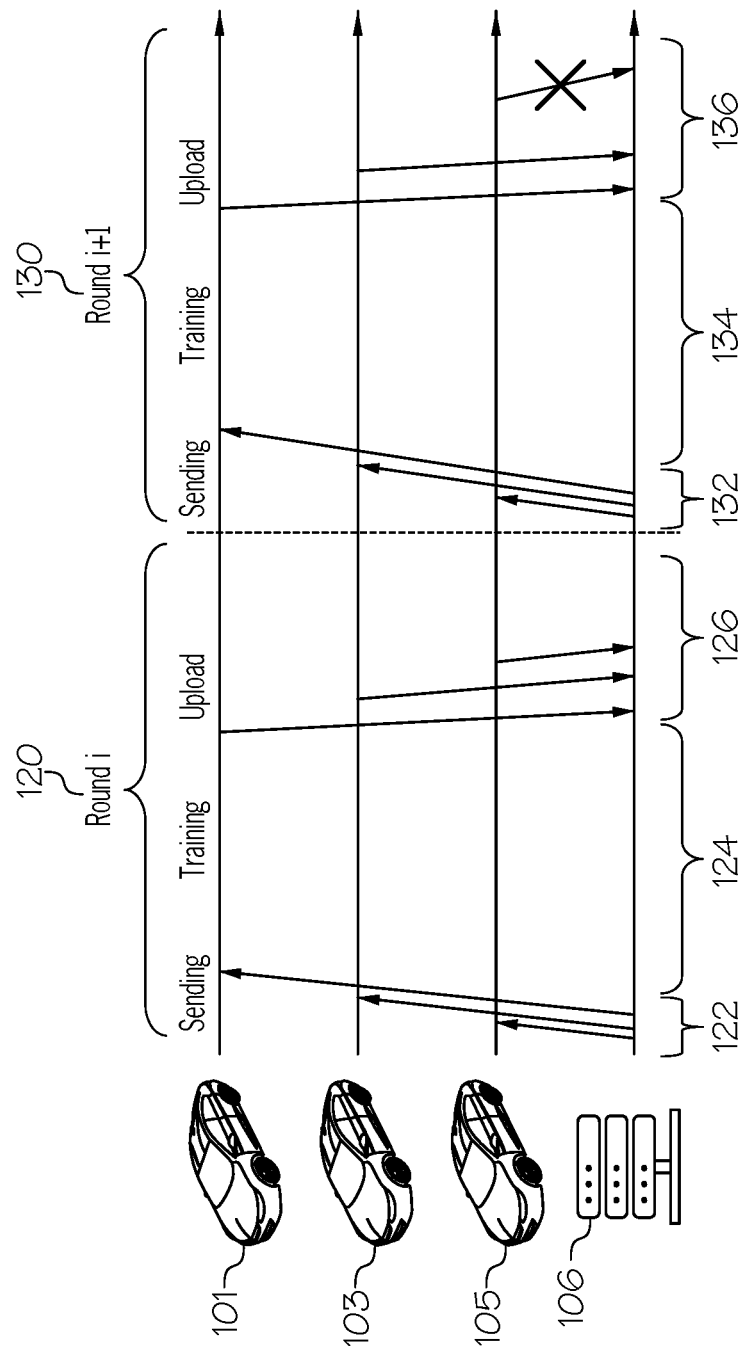
FIG. 1B schematically depicts a sequence diagram for updating local machine learning models, in accordance with one or more embodiments shown and described herewith.

The embodiments disclosed herein include communication-aware federated learning considering bandwidth information among edge nodes and an edge server. According to the embodiments, a system for communication-aware federated learning includes a server and a plurality of vehicles. By referring to FIG. 1B, each of the edge nodes or vehicles 101, 103, 105 trains a machine learning model using first local data obtained by sensors of corresponding vehicle. Each of the vehicles 101, 103, 105 obtains network bandwidth for a channel between corresponding vehicle and the server 106. One or more of the vehicles 101, 103, 105 determines a level of compression based on the bandwidth for the channel, compresses the trained machine leaning model based on the determined level of compression, and transmits the compressed trained machine learning model to the server. For example, vehicle 101 and 103 may compress their trained machine learning models whereas the vehicle 105 may not compress its trained machine learning models. The server 106 decompresses the compressed trained machine learning models, aggregates the decompressed trained machine learning models to obtain an aggregated machine learning model, and transmits the aggregated machine learning model to each of the vehicle 101, 103, 105. Each of the vehicles 101, 103, 105 receives the aggregated machine learning model from the server, and controls the vehicle to drive autonomously based on the aggregated machine learning model. For example, the aggregated machine learning model may be used for object detection, object classification, and the like. Because the present system dynamically monitors the network bandwidth for a channel between each of the vehicles and the server and selectively compresses trained machine learning models, all of the trained machine learning models can be completely uploaded to the server within a designated time window even when a network bandwidth decreases.

FIG. 1A schematically depicts a system for updating local machine learning models using federated learning, in accordance with one or more embodiments shown and described herewith.

The system includes a plurality of edge nodes 101, 103, 105, 107, and 109, and a server 106. Training for a model is conducted in a distributed manner under a network of the edge nodes 101, 103, 105, 107, and 109 and the server 106. The model may include an image processing model, an object perception model, an object classification model, or any other model that may be utilized by vehicles in operating the vehicles. The model may be a machine learning model including, but not limited to, supervised learning models such as neural networks, decision trees, linear regression, and support vector machines, unsupervised learning models such as Hidden Markov models, k-means, hierarchical clustering, and Gaussian mixture models, and reinforcement learning models such as temporal difference, deep adversarial networks, and Q-learning. While FIG. 1 depicts five edge nodes, the system may include more than or less than five edge nodes. Edge nodes 101, 103, 105, 107, and 109 may have different datasets and different computing resources. The network bandwidth for a channel between each of the edge nodes 101, 103, 105, 107, 109 and the server 106 may be varied depending on communication conditions.

In embodiments, each of the edge nodes 101, 103, 105, 107, and 109 may be a vehicle, and the server 106 may be a centralized server or an edge server. The vehicle may be an automobile or any other passenger or non-passenger vehicle such as, for example, a terrestrial, aquatic, and/or airborne vehicle. The vehicle may be an autonomous vehicle that navigates its environment with limited human input or without human input. Each vehicle may drive on a road and perform vision-based lane centering, e.g., using a forward facing camera. Each vehicle may include actuators for driving the vehicle, such as a motor, an engine, or any other powertrain. In some embodiments, each of the edge nodes 101, 103, 105, 107, and 109 may be an edge server, and the server 106 may be a centralized server. In some embodiments, the edge nodes 101, 103, 105, 107, and 109 are vehicle nodes, and the vehicles may communicate with a centralized server such as the server 106 via an edge server.

In embodiments, the server 106 sends an initialized model to each of the edge nodes 101, 103, 105, 107, and 109. The initialized model may be any model that may be utilized for operating a vehicle, for example, an image processing model, an object detection model, or any other model for advanced driver assistance systems. Each of the edge nodes 101, 103, 105, 107, and 109 trains the received initialized model using local data to obtain an updated local model and sends the updated local model or parameters of the updated local model back to the server 106. The server 106 collects the updated local models, computes a global model based on the updated local models, and sends the global model to each of the edge nodes 101, 103, 105, 107, and 109. Due to communication and privacy issues in vehicular object detection applications, such as dynamic mapping, self-driving, and road status detection, the federated learning framework can be an effective framework for addressing these issues in traditional centralized models. The edge nodes 101, 103, 105, 107, and 109 may be in different areas with different driving conditions. For example, some of the edge nodes 101, 103, 105, 107, and 109 are driving in a rural area, some are driving in a suburb, and some are driving in a city. In addition, the edge nodes 101, 103, 105, 107, and 109 may have different computing power and be equipped different types of sensors and/or different numbers of sensors.

In embodiments, each of the edge nodes 101, 103, 105, 107, and 109 may determine whether or not to compress its locally trained machine learning model before transmitting the model to the server 106 based on bandwidth information between corresponding edge node and the server 106. For example, each of the edge nodes 101, 103, 105, 107, and 109 may determine whether the locally trained machine learning model can be uploaded to the server 106 within a designated time window considering current bandwidth information for corresponding channel between corresponding edge node and the server 106. In embodiments, each of the edge nodes 101, 103, 105, 107, and 109 may determine a level of compression for the locally trained machine learning model based on the current bandwidth information. Details about determining a level of compression and compressing trained machine learning models will be described with reference to FIGS. 2-4 below.

FIG. 1B schematically depicts a sequence diagram for updating local machine learning models, in accordance with one or more embodiments shown and described herewith.

While FIG. 1B depicts two rounds of federated learning, more than or less than two rounds of federated learning may be utilized for federated learning for the present system. Each round corresponding to a predetermined time window during which downloading a global model from a server to vehicles and uploading locally trained machine learning models from the vehicles to the server are implemented. In this example, a round i 120 includes three periods 122, 124, 126. During the period 122, the server 106 transmits a global model to the vehicles 101, 103, 105. While FIG. 1B depicts three vehicles, more than or less than three vehicles may be included in the present system. During the period 124, each of the vehicles 101, 103, 105 trains the received global machine learning model using local data obtained by sensors of corresponding vehicle. During the period 126, each of the vehicles 101, 103, 105 uploads its locally trained machine learning model to the server 106. In this example, during the period 126, each of the vehicles 101, 103, 105 successfully uploaded its locally trained machine learning model to the server 106.

Similar to round i 120, a round i+1 130 also includes three periods 132, 134, 136. During the period 132, the server 106 transmits an aggregated global machine learning model to the vehicles 101, 103, 105. During the period 134, each of the vehicles 101, 103, 105 trains the received aggregated global machine learning model using local data obtained by sensors of corresponding vehicle. During the period 136, each of the vehicles 101 and 103 may successfully upload its locally trained machine learning model to the server 106. However, during the period 136 the vehicle 105 may not successfully upload its locally trained machine learning model to the server 106 because of a decrease in network bandwidth for a channel between the vehicle 105 and the server 106 during the period 136. Then, the server 106 may not receive information on the machine learning model locally trained by the vehicle 105, which results in loss of valuable training data. In order to address this issue, the present system monitors information on a network bandwidth for a channel between each of the vehicles 101, 103, 105, and the server 106 and selectively compresses a locally trained machine learning model if the locally trained machine learning may not be uploaded to the server 106 within a predetermined time window, e.g., the period 136.

FIG. 2 depicts a schematic diagram of a system for updating models for image processing using federated learning, according to one or more embodiments shown and described herein. The system includes a first edge node system 200, a second edge node system 220, and the server 106. While FIG. 2 depicts two edge node systems, more than two edge node systems may communicate with the server 106.

It is noted that, while the first edge node system 200 and the second edge node system 220 are depicted in isolation, each of the first edge node system 200 and the second edge node system 220 may be included within a vehicle in some embodiments, for example, respectively within two of the edge nodes 101, 103, 105, 107, 109 of FIG. 1. In embodiments in which each of the first edge node system 200 and the second edge node system 220 is included within an edge node, the edge node may be an automobile or any other passenger or non-passenger vehicle such as, for example, a terrestrial, aquatic, and/or airborne vehicle. In some embodiments, the vehicle is an autonomous vehicle that navigates its environment with limited human input or without human input. In some embodiments, the edge node may be an edge server that communicates with a plurality of vehicles in a region and communicates with a centralized server such as the server 106.

The first edge node system 200 includes one or more processors 202. Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the system. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as Wifi, Bluetooth®, Near Field Communication (NFC), and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The first edge node system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL. 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The one or more processor 202 along with the one or more memory modules 206 may operate as a controller for the first edge node system 200.

The one or more memory modules 206 includes a machine learning (ML) model training module 207, a bandwidth profiler 209, and a model compressor 211. Each of the ML model training module 207, the bandwidth profiler 209, and the model compressor 211 may include, but not limited to, routines, subroutines, programs, objects, components, data structures, and the like for performing specific tasks or executing specific data types as will be described below.

The ML model training module 207 may train the initial model received from the server 106 using local data obtained by the first edge node system 200, for example, images obtained by imaging sensors such as cameras of a vehicle. The initial model may be a machine learning model including, but not limited to, supervised learning models such as neural networks, decision trees, linear regression, and support vector machines, unsupervised learning models such as Hidden Markov models, k-means, hierarchical clustering, and Gaussian mixture models, and reinforcement learning models such as temporal difference, deep adversarial networks, and Q-learning. The ML model training module 207 obtains parameters of a trained model, which may be transmitted to the server as an updated local machine learning model. The ML model training module 207 may also train an aggregated global model received from the server 106 using local data obtained by the first edge node system 200.

The bandwidth profiler 209 may obtain a network bandwidth for a communication channel between the first edge node system 200 and the server 106. For example, the network bandwidth may be a measurement indicating the maximum capacity of the communication channel to transmit data over a network connection in a given amount of time. The network bandwidth may be expressed in bits per second (bps), megabits per second (Mbps) or gigabits per second (Gbps). The bandwidth profiler 209 may obtain both for an uplink bandwidth (i.e., vehicle-to-server) and a downlink bandwidth (i.e., server-to-vehicle).

The model compressor 211 may compress a trained machine learning model trained by the ML model training module 207. The model compressor 211 may determine a level of compression based on the network bandwidth obtained by the bandwidth profiler 209. The level of compression may be inversely correlated to the level of network bandwidth. For example, if the network bandwidth is relatively low or the channel between a vehicle and a server allows relatively low speed data communication, the level of compression may need to be relatively high. i.e., a high compression ratio. If the network bandwidth is relatively high or the channel between a vehicle and a server allows relatively high speed data communication, the level of compression may be relatively low, i.e., a low compression ratio. Then, the model compressor 211 may compress the trained machine learning model based on the determined level of compression. For example, the model compressor 211 may compress the trained machine learning model by quantizing the parameters of the trained machine learning model. The level of quantization may be determined based on the level of compression. For example, 2 bit quantization instead of 4 bit quantization may be utilized to compress parameters of the trained machine learning model if the determined level of compression is high, i.e., the trained machine learning model needs to be compressed significantly. In some embodiments, the model compressor 211 may compress the trained machine learning model using other compression schemes, such as knowledge distillation, removing unused parameters, and the like. In some embodiments, the first edge node system 200 may transmit information about the compression scheme used by the model compressor 211 to the server 106 such that the server 106 can decompress the compressed trained machine learning model based on the received information about the compression scheme used.

Referring still to FIG. 2, the first edge node system 200 comprises one or more sensors 208. The one or more sensors 208 may include a forward facing camera installed in a vehicle. The one or more sensors 208 may be any device having an array of sensing devices capable of detecting radiation in an ultraviolet wavelength band, a visible light wavelength band, or an infrared wavelength band. The one or more sensors 208 may have any resolution. In some embodiments, one or more optical components, such as a mirror, fish-eye lens, or any other type of lens may be optically coupled to the one or more sensors 208. In embodiments described herein, the one or more sensors 208 may provide image data to the one or more processors 202 or another component communicatively coupled to the communication path 204. In some embodiments, the one or more sensors 208 may also provide navigation support. That is, data captured by the one or more sensors 208 may be used to autonomously or semi-autonomously navigate a vehicle.

In some embodiments, the one or more sensors 208 include one or more imaging sensors configured to operate in the visual and/or infrared spectrum to sense visual and/or infrared light. Additionally, while the particular embodiments described herein are described with respect to hardware for sensing light in the visual and/or infrared spectrum, it is to be understood that other types of sensors are contemplated. For example, the systems described herein could include one or more LIDAR sensors, radar sensors, sonar sensors, or other types of sensors for gathering data that could be integrated into or supplement the data collection described herein. Ranging sensors like radar may be used to obtain a rough depth and speed information for the view of the first edge node system 200.

The first edge node system 200 comprises a satellite antenna 214 coupled to the communication path 204 such that the communication path 204 communicatively couples the satellite antenna 214 to other modules of the first edge node system 200. The satellite antenna 214 is configured to receive signals from global positioning system satellites. Specifically, in one embodiment, the satellite antenna 214 includes one or more conductive elements that interact with electromagnetic signals transmitted by global positioning system satellites. The received signal is transformed into a data signal indicative of the location (e.g., latitude and longitude) of the satellite antenna 214 or an object positioned near the satellite antenna 214, by the one or more processors 202.

The first edge node system 200 comprises one or more vehicle sensors 212. Each of the one or more vehicle sensors 212 is coupled to the communication path 204 and communicatively coupled to the one or more processors 202. The one or more vehicle sensors 212 may include one or more motion sensors for detecting and measuring motion and changes in motion of a vehicle, e.g., the edge node 101. The motion sensors may include inertial measurement units. Each of the one or more motion sensors may include one or more accelerometers and one or more gyroscopes. Each of the one or more motion sensors transforms sensed physical movement of the vehicle into a signal indicative of an orientation, a rotation, a velocity, or an acceleration of the vehicle.

Still referring to FIG. 2, the first edge node system 200 comprises network interface hardware 216 for communicatively coupling the first edge node system 200 to the second edge node system 220 and/or the server 106. The network interface hardware 216 can be communicatively coupled to the communication path 204 and can be any device capable of transmitting and/or receiving data via a network. Accordingly, the network interface hardware 216 can include a communication transceiver for sending and/or receiving any wired or wireless communication. For example, the network interface hardware 216 may include an antenna, a modem, LAN port, WiFi card, WiMAX card, mobile communications hardware, near-field communication hardware, satellite communication hardware and/or any wired or wireless hardware for communicating with other networks and/or devices. In one embodiment, the network interface hardware 216 includes hardware configured to operate in accordance with the Bluetooth® wireless communication protocol. The network interface hardware 216 of the first edge node system 200 may transmit its data to the second edge node system 220 or the server 106. For example, the network interface hardware 216 of the first edge node system 200 may transmit vehicle data, location data, updated local model data and the like to the server 106.

The first edge node system 200 may connect with one or more external vehicle systems (e.g., the second edge node system 220) and/or external processing devices (e.g., the server 106) via a direct connection. The direct connection may be a vehicle-to-vehicle connection ("V2V connection"), a vehicle-to-everything connection ("V2X connection"), or a mmWave connection. The V2V or V2X connection or mmWave connection may be established using any suitable wireless communication protocols discussed above. A connection between vehicles may utilize sessions that are time-based and/or location-based. In embodiments, a connection between vehicles or between a vehicle and an infrastructure element may utilize one or more networks to connect, which may be in lieu of, or in addition to, a direct connection (such as V2V, V2X, mmWave) between the vehicles or between a vehicle and an infrastructure. By way of non-limiting example, vehicles may function as infrastructure nodes to form a mesh network and connect dynamically on an ad-hoc basis. In this way, vehicles may enter and/or leave the network at will, such that the mesh network may self-organize and self-modify over time. Other non-limiting network examples include vehicles forming peer-to-peer networks with other vehicles or utilizing centralized networks that rely upon certain vehicles and/or infrastructure elements. Still other examples include networks using centralized servers and other central computing devices to store and/or relay information between vehicles.

Still referring to FIG. 2, the first edge node system 200 may be communicatively coupled to the server 106 by the network 250. In one embodiment, the network 250 may include one or more computer networks (e.g., a personal area network, a local area network, or a wide area network), cellular networks, satellite networks and/or a global positioning system and combinations thereof. Accordingly, the first edge node system 200 can be communicatively coupled to the network 250 via a wide area network, via a local area network, via a personal area network, via a cellular network, via a satellite network, etc. Suitable local area networks may include wired Ethernet and/or wireless technologies such as, for example, Wi-Fi. Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Still referring to FIG. 2, the second edge node system 220 includes one or more processors 222, one or more memory modules 226, one or more sensors 228, one or more vehicle sensors 232, a satellite antenna 234, and a communication path 224 communicatively connected to the other components of the second edge node system 220. The components of the second edge node system 220 may be structurally similar to and have similar functions as the corresponding components of the first edge node system 200 (e.g., the one or more processors 222 corresponds to the one or more processors 202, the one or more memory modules 226 corresponds to the one or more memory modules 206, the one or more sensors 228 corresponds to the one or more sensors 208, the one or more vehicle sensors 232 corresponds to the one or more vehicle sensors 212, the satellite antenna 234 corresponds to the satellite antenna 214, the communication path 224 corresponds to the communication path 204, the network interface hardware 236 corresponds to the network interface hardware 216, the ML model training module 227 corresponds to the ML model training module 207, a bandwidth profiler 229 corresponds to the bandwidth profiler 209, and a model compressor 231 corresponds to the model compressor 211).

Still referring to FIG. 2, the server 106 includes one or more processors 242, one or more memory modules 246, network interface hardware 248, and a communication path 244. The one or more processors 242 may be a controller, an integrated circuit, a microchip, a computer, or any other computing device. The one or more memory modules 246 may comprise RAM, ROM, flash memories, hard drives, or any device capable of storing machine readable and executable instructions such that the machine readable and executable instructions can be accessed by the one or more processors 242. The one or more memory modules 246 may include a model decompressor 245, a global model update module 247 and a data storage 249. Each of the model decompressor 245, the global model update module 247 and the data storage 249 may include, but is not limited to, routines, subroutines, programs, objects, components, data structures, and the like for performing specific tasks or executing specific data types as will be described below.

The model decompressor 245 may decompress one or more compressed trained machine learning models received from edge nodes. For example, the first edge node system 200 may send a trained machine learning model without compression whereas the second edge node system 220 may send a compressed trained machine learning model. In this case, the model decompressor 245 may decompress the compressed trained machine learning model received from the second edge node system 220. In some embodiments, the server 106 may receive information about a compression scheme used for compressing the trained machine learning model and the model decompressor 245 may use the information about the compression scheme to decompress the compressed trained machine learning model.

The global model update module 247 generates a global model based on trained machine learning models received from edge nodes and transmits the updated global model to the edge nodes. Specifically, by referring to FIG. 1, the sever 106 receives trained machine learning models from the edge nodes 101, 103, 105, 107, and 109. If there is a trained machine learning model that is compressed, the model decompressor 245 decompresses the compressed trained machine learning model. The global model update module 247 aggregates decompressed local machine learning models and normal local machine learning models that have not been compressed by edge nodes to generate a global model. Specifically, the global model update module 247 determines weights for the local models received from the edge nodes 101, 103, 105, 107, and 109. Then, the global model update module 247 may combine the local models with the weights assigned to the local models. For example, the global model update module 247 may calculate weighted averages of the parameters of the local models based on the determined weights.

The data storage 249 may store the trained machine learning models received from the edge nodes. The data storage 249 may also store a global model calculated by the global model update module 247.

Figure 3:
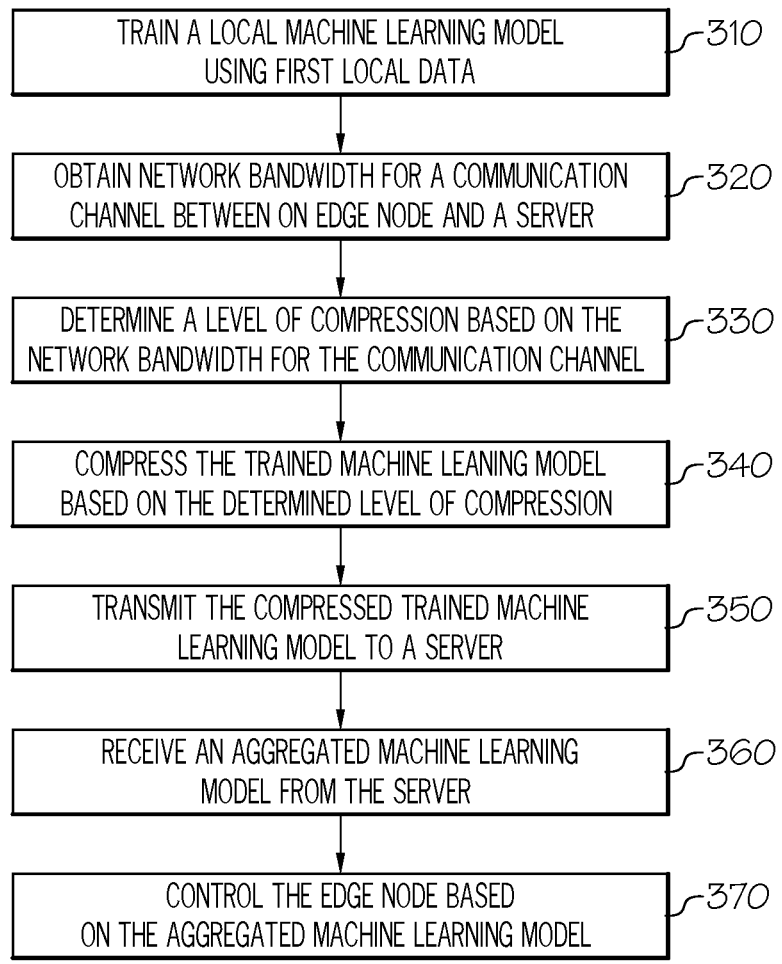
FIG. 3 depicts a flowchart for updating models for updating local machine learning models, according to one or more embodiments shown and described herein.

FIG. 3 depicts a flowchart for updating models for updating local machine learning models, according to one or more embodiments shown and described herein.

In step 310, each of a plurality of edge nodes trains a local machine learning model using first local data. For example, by referring to FIG. 1A, during a first period, the edge node 101 captures images using its imaging sensor and trains a local machine learning model using the captured images as a training data set. Similarly, each of the edge nodes 103, 105, 107, and 109 captures images using its imaging sensor and trains a local machine learning model using the captured images as a training data set.

Referring back to FIG. 3, in step 320, each of the plurality of edge nodes obtains network bandwidth for a communication channel between corresponding edge node and a server. By referring to FIG. 2, the bandwidth profiler 209 may obtain both for an uplink bandwidth (i.e., vehicle-to-server) and a downlink bandwidth (i.e., server-to-vehicle). The network bandwidth may be a measurement indicating the maximum capacity of the communication channel to transmit data over a network connection in a given amount of time. The bandwidth may be expressed in bits per second (bps), megabits per second (Mbps) or gigabits per second (Gbps).

Referring back to FIG. 3, in step 330, each of the plurality of edge nodes determines a level of compression based on the network bandwidth for corresponding communication channel. For example, if the trained machine learning model of an edge node can be completely uploaded to the server within a designated time window given the network bandwidth, i.e., an uplink bandwidth, the edge node determines that the trained machine learning model does not need to be compressed. If the trained machine learning model of an edge node cannot be completely uploaded to the server within a designated time window given the network bandwidth, the edge node determines that the trained machine learning model needs to be compressed. Then, the edge node may determine the level of compression that may be used for compressing the trained machine learning model. The level of compression may be, for example, a quantization level (e.g., 4 bits quantization) used for quantizing the trained machine learning model. Specifically, the edge node may find 3 bits, 4 bits, 5 bits quantization schemes are viable compression schemes. If the 5 bits quantization scheme does not compress the trained machine learning model enough to allow the upload of the compressed trained machine learning model during a designated time window, the edge node may select lower bit quantization scheme. For example, if the 4 bits quantization scheme compresses the trained machine learning model enough to allow the upload of the compressed trained machine learning model during a designated time window, then the edge node may select the 4 bits quantization scheme for compressing the corresponding trained machine learning model.

In step 340, each of the plurality of edge nodes compresses corresponding trained machine learning model based on the determined level of compression. For example, an edge node compresses the parameters of the trained machine learning model using the determined quantization level.

In step 350, each of the plurality of edge nodes transmits the compressed trained local machine learning model to a server. For example, by referring to FIG. 1, each of the edge nodes 101, 103, 105, 107, and 109 transmits its compressed trained local machine learning model to the server 106 via V2X communication. In some embodiments, only some of the edge nodes compress their trained local machine learning models and the remaining edge nodes may transmit their local machine learning models without compression.

Referring back to FIG. 3, in step 360, each of the plurality of edge nodes receives an aggregated machine learning model from the server. For example, by referring to FIG. 1, each of the edge nodes 101, 103, 105, 107, and 109 receives an aggregated machine leaning model from the server 106. The server 106 aggregates compressed trained machine learning models received from the edge nodes 101, 103, 105, 107, and 109 and transmits the aggregated machine learning model to the edge nodes 101, 103, 105, 107, and 109.

Referring back to FIG. 3, in step 370, each of the plurality of edge nodes controls operations of the edge nodes based on the aggregated machine learning model. For example, by referring to FIG. 1, the edge node 101 controls the vehicle to drive autonomously based on the aggregated machine learning model.

In some embodiments, each of the plurality of edge nodes may transmit, to the server, the information about a downlink bandwidth for a channel between corresponding edge node and the server. Then, the server may determine whether an aggregated machine learning model can be completely transmitted to each of the plurality of edge nodes within a designed time window, e.g., the period 122 in FIG. 1B, given the downlink bandwidth. If the aggregated machine learning model cannot be completely transmitted to one or more of the plurality of edge nodes within a designed time window, the server may compress the aggregated machine learning model and transmit the compressed aggregated machine learning model to the one or more of the plurality of edge nodes.

Figure 4:
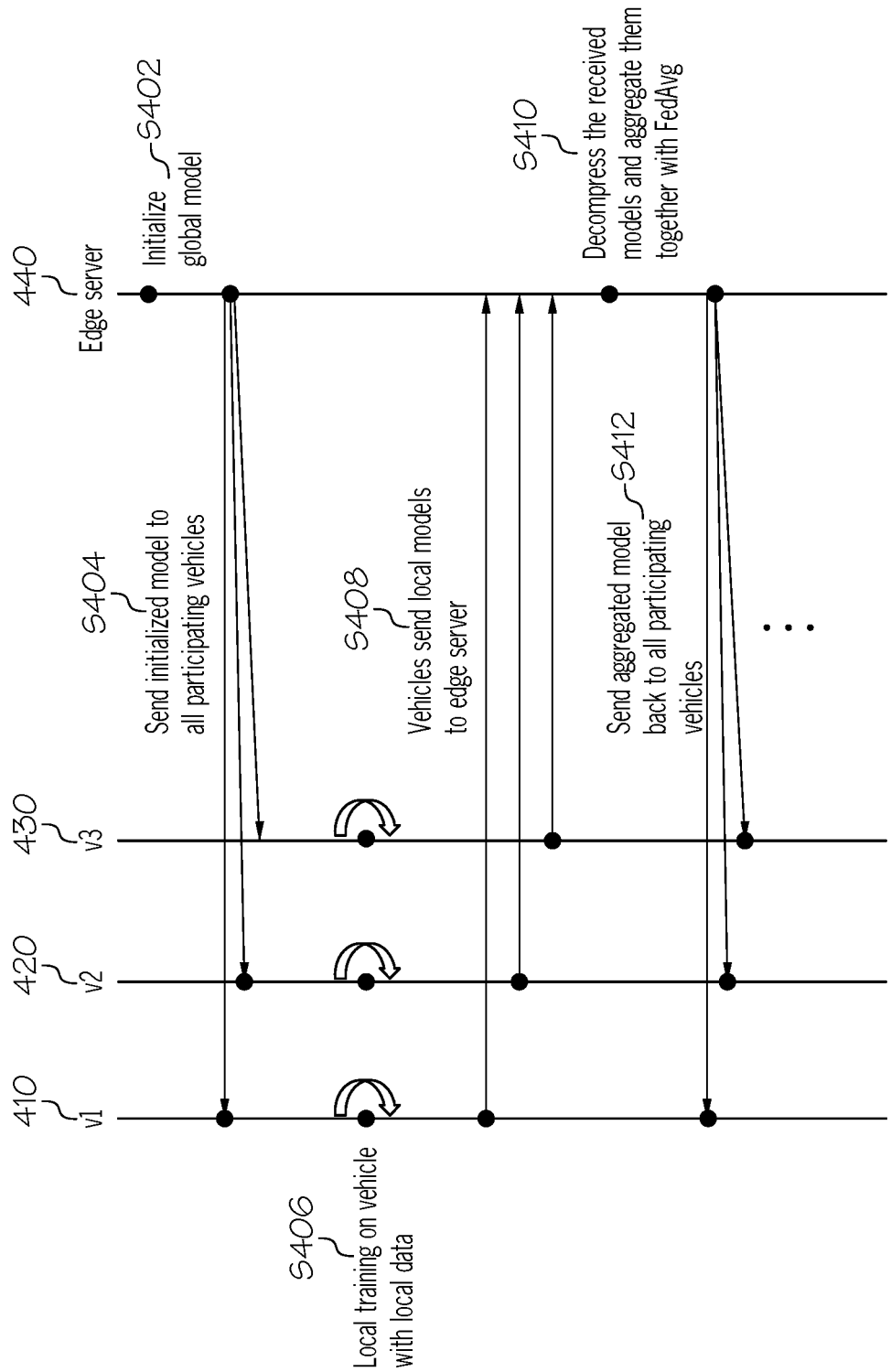
FIG. 4 depicts a sequence diagram for the present system, according to one or more embodiments shown and described herein.

FIG. 4 depicts a sequence diagram for the present system, according to one or more embodiments shown and described herein.

In FIG. 4, the system includes three vehicles 410, 420, 430 and an edge server 440. The system may include more than or less than three vehicles. In step S402, the edge server 440 initializes a global model. In step S404, the edge server 440 transmits the initialized global model to each of the vehicles 410, 420, 430. In step S406, each of the vehicles 410, 420, 430 trains the initialized global model using its local data such as images captured by the vehicles 410, 420, 430, respectively. Each of the vehicles 410, 420, 430 may compress the trained model if the trained model cannot be completely uploaded to the edge server 440 within a designated time window. In step S408, each of the vehicles 410, 420, 430 transmits the compressed trained model for the vehicles 410, 420, 430 to the edge server 440. In step S410, the edge server 440 decompresses the compressed trained models and fuses the decompressed trained local models to obtain an aggregated global model. In step S412, the edge server 440 transmits the aggregated global model to the vehicles 410, 420, 430. Then, each of the vehicles 410, 420, 430 again trains the aggregated global model using its local data. In addition, each of the vehicles 410, 420, 430 may drive autonomously using the aggregated global model or autonomous driving.

It should be understood that embodiments described herein are directed to a vehicle includes a controller programmed to train a machine learning model using first local data; obtain network bandwidth for a channel between the vehicle and a server, determine a level of compression based on the network bandwidth for the channel, compress the trained machine leaning model based on the determined level of compression, transmit the compressed trained machine learning model to the server, receive an aggregated machine learning model from the server, and control the vehicle to drive autonomously based on the aggregated machine learning model. Because the present system dynamically monitors the network bandwidth for a channel between each of the vehicles and the server and selectively compresses trained machine learning models based on the current network bandwidth status, all of the trained machine learning models can be completely uploaded to the server within a designated time window even when a network bandwidth decreases.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
a controller programmed to:
train a machine learning model using first local data;
obtain a network bandwidth for a channel between the vehicle and a server;
determine a level of compression based on the network bandwidth for the channel;
compress the trained machine leaning model based on the determined level of compression;
transmit the compressed trained machine learning model to the server;
receive an aggregated machine learning model from the server; and
control the vehicle to drive autonomously based on the aggregated machine learning model.

2. The vehicle according to claim 1, wherein the controller is further programmed to:
train the aggregated machine learning model using second local data;
detect a change in the network bandwidth for the channel;
determine another level of compression based on the changed network bandwidth;
compress the trained aggregated machine learning model based on the another level of compression; and
transmit the compressed trained aggregated machine learning model to the server.

3. The vehicle according to claim 1, wherein the level of compression is inversely correlated to the network bandwidth.

4. The vehicle according to claim 1, wherein the controller is further programmed to:
compress the trained machine leaning model by quantizing parameters of the trained machine leaning model.

5. The vehicle according to claim 1, wherein the controller is programmed to:
compress the trained machine leaning model based on knowledge distillation of the trained machine leaning model.

6. The vehicle according to claim 1, wherein the controller is programmed to:
transmit, to the server, information about a compression scheme used to compress the trained machine leaning model.

7. The vehicle according to claim 1, further comprising:
an imaging sensor configured to capture the first local data.

8. The vehicle according to claim 1, wherein the controller is a graphics processing unit.

9. The vehicle according to claim 1, wherein the controller is programmed to:
determine whether the trained machine leaning model can be completely uploaded to the server within a designated time window based on the obtained network bandwidth; and
compress the trained machine leaning model based on the determined level of compression in response to determining that the trained machine leaning model cannot be completely uploaded to the server within a designated time window.

10. The vehicle according to claim 1, wherein the controller is programmed to operate one or more actuators of the vehicle to keep the vehicle within lane boundaries using the aggregated machine learning model.

11. A method for communication-aware federated learning, the method comprising:
training a machine learning model using first local data;
obtaining a network bandwidth for a channel between a vehicle and a server;
determining a level of compression based on the network bandwidth for the channel;
compressing the trained machine leaning model based on the determined level of compression;
transmitting the compressed trained machine learning model to the server;
receiving an aggregated machine learning model from the server; and
controlling the vehicle to drive autonomously based on the aggregated machine learning model.

12. The method of claim 11, further comprising:
training the aggregated machine learning model using second local data;
detecting a change in the network bandwidth for the channel;
determining another level of compression based on the changed network bandwidth;
compressing the trained aggregated machine learning model based on the another level of compression; and
transmitting the compressed trained aggregated machine learning model to the server.

13. The method of claim 11, wherein the level of compression is inversely correlated to the network bandwidth.

14. The method of claim 11, further comprising:
transmitting, to the server, information about a compression scheme used to compress the trained machine leaning model.

15. The method of claim 11, further comprising:
determining whether the trained machine leaning model can be completely uploaded to the server within a designated time window based on the obtained network bandwidth; and
compressing the trained machine leaning model based on the determined level of compression in response to determining that the trained machine leaning model cannot be completely uploaded to the server within a designated time window.

16. A system for communication-aware federated learning, the system comprising:
a server; and
a plurality of vehicles, each of the vehicles comprising a controller programmed to:
train a machine learning model using first local data;
obtain a network bandwidth for a channel between the vehicle and the server;

determine a level of compression based on the bandwidth for the channel;

compress the trained machine leaning model based on the determined level of compression;

transmit the compressed trained machine learning model to the server;

receive an aggregated machine learning model from the server; and control the vehicle to drive autonomously based on the aggregated machine learning model, wherein the server generates the aggregated machine learning model based on the compressed trained machine learning models from the plurality of vehicles.

17. The system of claim 16, wherein the server comprises a controller programmed to decompress the compressed trained machine learning models.

18. The system of claim 16, wherein the controller is further programmed to:

train the aggregated machine learning model using second local data;

detect a change in the network bandwidth for the channel;

determine another level of compression based on the changed network bandwidth;

compress the trained aggregated machine learning model based on the another level of compression; and transmit the compressed trained aggregated machine learning model to the server.

19. The system of claim 16, wherein the level of compression is inversely correlated to the network bandwidth.

20. The system of claim 16, wherein the controller is programmed to:

determine whether the trained machine leaning model can be completely uploaded to the server within a designated time window based on the obtained network bandwidth; and compress the trained machine leaning model based on the determined level of compression in response to determining that the trained machine leaning model cannot be completely uploaded to the server within a designated time window.

* * * * *